Sept. 12, 1950 W. D. HARVEY ET AL 2,521,794
LIQUID LEVEL METERING MECHANISM
Filed Jan. 19, 1946
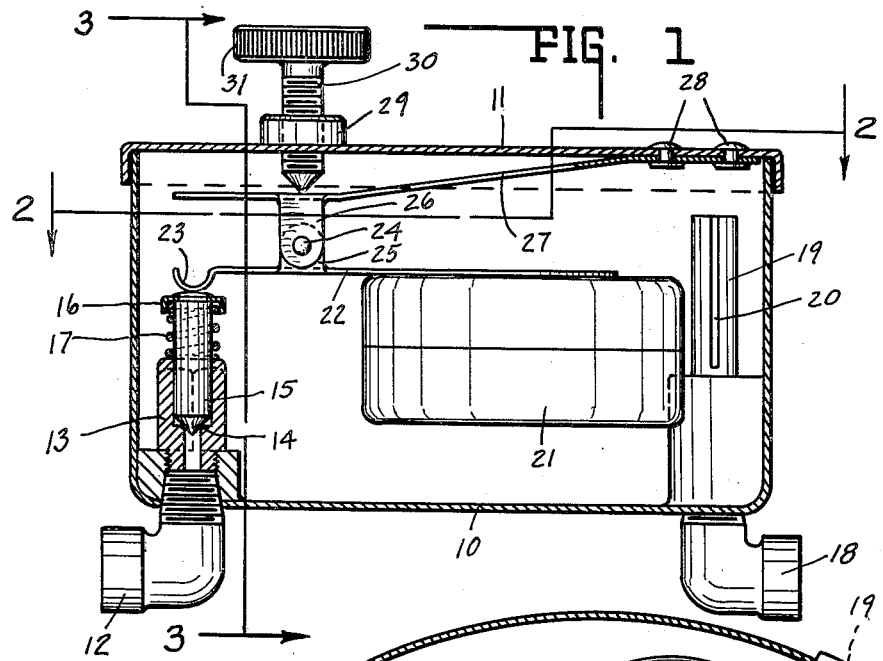
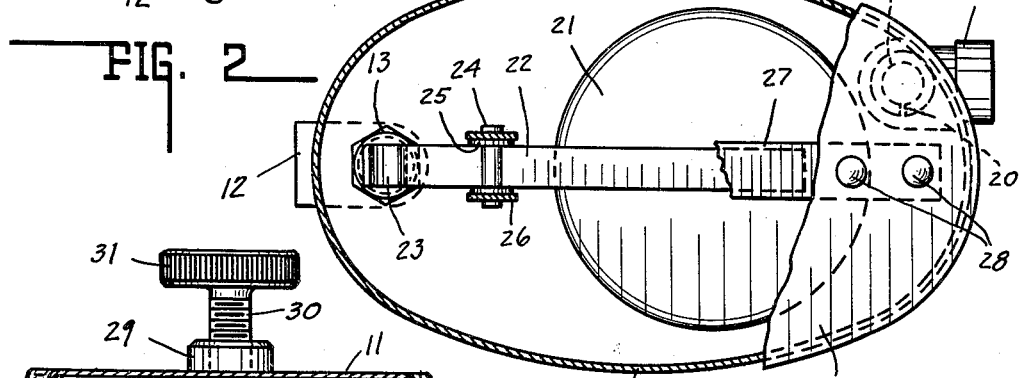
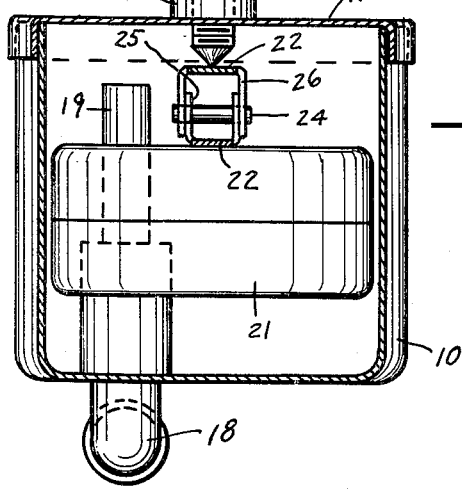
INVENTORS.
WILLIAM DOW HARVEY,
DONALD B. TOLLEY.
BY
Lockwood Goldsmith & Galt
ATTORNEYS.

Patented Sept. 12, 1950

2,521,794

UNITED STATES PATENT OFFICE 2,521,794

LIQUID LEVEL METERING MECHANISM

William Dow Harvey and Donald B. Tolley, Macomb, Ill., assignors to Globe American Corporation, Kokomo, Ind., a corporation Application January 19, 1946, Serial No. 642,364

1 Claim. (Cl. 137—68)

This invention relates to a liquid level control and metering mechanism of the float actuating type, and wherein such mechanism is particularly applicable to the control or metering of oil flow from a storage tank to an oil burner.

In the control of the oil flow to oil burners it is customary to provide a high level tank and means for metering the flow of the fuel oil from the tank to the burner through the medium of a float controlled mechanism such as to maintain a constant pressure against a valve which meters the amount of oil admitted to the burner. Such a valve is sometimes built into the chamber of the float mechanism, or it may be a separate unit between the float chamber and the burner.

It is one object of the invention to eliminate such a metering valve and provide a float adjustment such as may be employed to meter the amount of oil admitted to the burner through adjustment of the float. This is accomplished by providing an adjustment for the float relative to the chamber inlet valve, such as to adjustably raise or lower the float with relation to the inlet control valve. Thus, the oil level may be raised in the float chamber to permit of a more rapid flow of oil through the outlet thereof, and lowered to reduce said flow by varying the effective elevation of the float.

Another object of the invention is to provide the outlet with a vertical slotted standpipe, such that the flow of fuel oil from the tank to the burner will be metered proportionately to the height of the liquid level maintained in the tank by the proper adjustment of the float.

The full nature of the invention will be understood from the accompanying drawings and the following description and claim:

Fig. 1 is a central vertical section through the liquid level control mechanism showing the float and regulator screw in elevation.

Fig. 2 is a top plan view with a portion of the top broken away.

Fig. 3 is a section taken on the line 3—3 of Fig. 2.

In the drawings there is illustrated a liquid level control mechanism which may be utilized for controlling the flow of liquid from a supply tank for any desired purpose, but is shown herein as applied to a fuel oil control for oil burners.

As illustrating one form of the invention there is provided a housing 10 having a removable cover 11 adapted to be secured thereover for providing a liquid metering chamber. At one side of said chamber there is a liquid inlet pipe connection 12 opening through the bottom of said chamber into communication with a valve fitting 13 having a valve seat 14 for receiving the valve stem 15 extending upwardly therefrom. Said valve stem is provided with a cap 16 and is surrounded by a spiral compression spring 17 bearing between the fitting 13 and cap 16 and normally acting to maintain said valve stem out of seating engagement to permit the flow of liquid through the inlet connection 12 and valve fitting into the liquid chamber.

Connected with the opposite end of the housing 10 and extending from the bottom thereof, there is a liquid outlet connection 18 in communication with a standpipe 19, slotted at 20 to permit passage of the liquid from the chamber to the outlet connection at a rate of flow proportional to the height of the liquid in the metering chamber. The inlet connection 12 may be connected with any suitable source of liquid supply, such as an elevated gravity feed storage tank. The outlet connection 18 may be connected with any liquid consumption device, such as an oil burner.

Inasmuch as the metering of the liquid through the slot 20 is controlled by the liquid level in the metering chamber, there is provided a float 21 adapted to freely ride and be floated by the liquid contained in the chamber in accordance with the level thereof. Said float controls the liquid level through the float lever 22. One end of said lever is rigidly secured to the float and the other end thereof is formed with a bearing head 23 positioned for engagement with the upper exposed end of the valve stem 15. The float lever 22 is fulcrumed intermediate its ends at 24 so that as the liquid lever rises, lifting the float and the connected end of the lever, the bearing end of the lever 23 will be depressed, forcing the valve stem to closed position against tension of the spring 17. As the liquid level drops, due to its metered passage through the slot 20, the valve stem will be released to permit its movement to open position through the tension of said spring. The liquid level in the chamber which controls the rate of flow of liquid through the outlet is in turn controlled by the raising or lowering of the fulcrum point of the float lever.

The lever 22 is formed with a pair of upstanding ears 25 which are pivotally connected to a pair of corresponding downwardly extending bracket members 26 formed or mounted upon a spring bar 27. Said spring bar is secured at one end to the underside of the cover plate 11 as by the rivets indicated at 28, its free end extending toward the other end of the cover plate in substantial alignment with the float lever 22. The tension of the spring bar is normally upward toward the underside of the cover plate. Mounted upon the cover plate 11 there is an internally threaded boss 29 through which a regulator screw 30 extends downwardly into engagement with the spring bar 27 directly over the bracket members and fulcrum support of the lever 22. Said regulator screw is provided with a cap 31 to permit of convenient adjustment of the screw.

Through the spring tension of the bar 27 and adjustment of the regulator screw up or down, the relative position of the fulcrum point of the lever 22 is raised or lowered with respect to the valve stem 15. Thus, by adjustment of the regulator screw downwardly, the position of the fulcrum point 24 will be lowered against tension of the spring bar 27 to thereby lower the position of the float and the relation of its lever 22 to the valve stem whereby the liquid supply will be controlled to supply liquid at the desired lower level. Upon adjustment of the screw upwardly, it will permit the bar 27 to rise under its spring tension to elevate the fulcrum point to supply liquid at the desired higher level.

By this convenient manipulation, the liquid level in the metering chamber may be controlled to varying heights in respect to the standpipe and metering slot 20, which in turn regulates the flow of liquid therethrough to the outlet.

Whereas we have shown and described one form or modification of a float structure illustrative of the invention, it is to be understood that the invention may be accomplished through variations and modifications within the scope of the appended claim, such that the operative relation of the float and the valve stem may be varied through convenient externally arranged adjustment to thereby control the liquid level in the chamber for the purpose above described.

The invention claimed is:

A liquid level control mechanism including a container for providing a liquid metering chamber having an outlet, a liquid inlet having a valve seat, a spring actuated valve stem engageable with said valve seat and spring biased to open positions, a float member in said chamber, a float lever having one end secured to said float member and the other end having bearing engagement with said valve stem for depressing it to closed position against spring tension, a spring bar having one end rigidly fixed to said container extending over and in alignment with said lever with its free end biased toward the top of said chamber, a pivotal connection between the free end of said bar and said lever intermediate its ends, and an adjusting screw extending through the top of said container into engagement with the free end of said spring bar for depressing it to adjusted position when moved in one direction while permitting it to flex upwardly under spring tension when moved to the other position, said bar acting to raise or lower the pivotal support of said lever relative to its relation to said valve stem to correspondingly control the liquid level of said chamber.

WILLIAM DOW HARVEY.
DONALD B. TOLLEY.

REFERENCES CITED

The following references are of record in the file of this patent:

UNITED STATES PATENTS

| Number | Name | Date |
|---|---|---|
| 543,527 | Garrigus | July 30, 1895 |
| 1,019,943 | Bright | Mar. 12, 1912 |
| 1,040,528 | Dock | Oct. 8, 1912 |
| 1,320,932 | Schmidt | Nov. 4, 1919 |
| 1,342,874 | Sessions | June 8, 1920 |
| 1,439,231 | Erickson | Dec. 19, 1922 |
| 1,672,872 | Chase | June 12, 1928 |
| 1,875,032 | Landgraft et al. | Aug. 30, 1932 |
| 2,068,138 | Johnson | Jan. 19, 1937 |
| 2,096,051 | MacLean | Oct. 19, 1937 |
| 2,172,647 | Widman | Sept. 12, 1939 |
| 2,336,730 | Hayter | Dec. 14, 1943 |
| 2,427,059 | Landon | Sept. 9, 1947 |

FOREIGN PATENTS

| Number | Country | Date |
|---|---|---|
| 10,261 | Great Britain | of 1890 |
| 742,365 | France | of 1932 |